United States Patent
Nomura

(10) Patent No.: US 9,073,531 B2
(45) Date of Patent: Jul. 7, 2015

(54) MOTOR CONTROL DEVICE AND VEHICLE BRAKE HYDRAULIC PRESSURE CONTROL APPARATUS

(71) Applicant: NISSIN KOGYO CO., LTD., Ueda, Nagano (JP)

(72) Inventor: Nobuyuki Nomura, Nagano (JP)

(73) Assignee: NISSIN KOGYO CO., LTD, Nagano (JP)

( * ) Notice: Subject to any disclaimer, the term of this patent is extended or adjusted under 35 U.S.C. 154(b) by 0 days.

(21) Appl. No.: 14/016,956

(22) Filed: Sep. 3, 2013

(65) Prior Publication Data

US 2014/0060038 A1 Mar. 6, 2014

(30) Foreign Application Priority Data

Sep. 5, 2012 (JP) ................................. 2012-194656

(51) Int. Cl.
*B60T 8/00* (2006.01)
*B60T 13/74* (2006.01)
*H02P 7/29* (2006.01)

(52) U.S. Cl.
CPC ................. *B60T 13/745* (2013.01); *H02P 7/29* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,153,492 A | * | 10/1992 | Landseadel | 318/599 |
| 5,811,947 A | * | 9/1998 | Hurst et al. | 318/370 |
| 2006/0097674 A1 | | 5/2006 | Nishihara et al. | |
| 2007/0057704 A1 | * | 3/2007 | Yokoo | 327/112 |
| 2009/0190904 A1 | * | 7/2009 | Emde et al. | 388/811 |
| 2011/0274415 A1 | * | 11/2011 | Schmidtlein et al. | 388/800 |
| 2012/0181961 A1 | * | 7/2012 | Kono et al. | 318/400.21 |

FOREIGN PATENT DOCUMENTS

| | | |
|---|---|---|
| EP | 2008896 A2 | 6/2008 |
| EP | 2008896 * | 12/2008 |
| JP | 2001010471 A | 1/2001 |
| WO | WO-2004042912 A1 | 5/2004 |

OTHER PUBLICATIONS

European Search Report for related EP Application No. 13182947.5-1756 dated Feb. 4, 2014, 7 pages.
Japanese Office Action for related JP Application No. 2012-194656 drafted Jul. 7, 2014 and dated Jul. 15, 2014, 4 pages.

* cited by examiner

*Primary Examiner* — John R Olszewski
*Assistant Examiner* — James M McPherson
(74) *Attorney, Agent, or Firm* — Andrew M. Calderon; Roberts, Mlotkowski, Safran & Cole, P.C.

(57) ABSTRACT

A motor control device (a motor driver) for controlling, by a duty control, a current supplied to a motor includes a driving controller, an off controller, and a voltage acquiring section (an A/D conversion processor, a sampling section). The driving controller performs on/off control of the current supplied to the motor with a first period. The off controller performs off control for the motor with a second period separately from the on/off control performed by the driving controller. The second period is longer than the first period. The voltage acquiring section acquires a voltage between terminals of the motor during a time period in which the off control is performed by the off controller.

18 Claims, 7 Drawing Sheets

MOTOR CONTROL DEVICE AND VEHICLE BRAKE HYDRAULIC PRESSURE CONTROL APPARATUS

CROSS REFERENCE TO RELATED APPLICATION

This application is based on and claims priority under 35 U.S.C. §119 to Japanese Patent Application No. 2012-194656 (filed on Sep. 5, 2012), the entire contents of which are incorporated herein by reference.

BACKGROUND

1. Technical Field

The invention relates to a motor control device that controls a motor by monitoring a voltage between terminals of a motor and a vehicle brake hydraulic pressure control apparatus including the motor control device.

2. Related Art

In motor control devices, a rotation state of a motor is detected in order to control the number of motor revolutions and/or detect an abnormality in the motor. The rotation state of the motor can be determined based on a counter electromotive force of the motor which is obtained by detecting a voltage between terminals of the motor.

To obtain the counter electromotive force accurately, it is desirable to detect the voltage between the terminals at instant at which a current does not flow though the motor (a voltage is not applied). Thus, in the PWM (Pulse Width Modulation) control in which turning on/off of a motor current is repeated based on a duty ratio of the motor current, the voltage between the terminals of the motor is measured during an off period in which a voltage is not applied to the motor (JP 2001-10471 A).

SUMMARY

Incidentally, when a motor is PWM controlled, turning on/off of a motor current makes fluctuation of the rotation of the motor be more large as the cycle of the PWM control becomes longer, which results in generation of vibrations in the motor and an increase of the operation noise thereof. Thus, in order for the motor to be allowed to rotate smoothly, it is desired that the motor is driven through an on/off control at a high frequency.

However, if the driving frequency is increased, a length of one cycle becomes short. This makes it difficult to detect a voltage between terminals of the motor. This is because in order to acquire the voltage between the terminals of the motor during the off period of the motor current in an ensured fashion, the voltage between the terminals of the motor has to be measured in a cycle which is far shorter than the cycle of the driving frequency. Because of this, a large processing load has to be borne on an A/D conversion of the detected voltage.

The invention provides a motor control device and a vehicle brake hydraulic pressure control apparatus that make it possible to easily detect a voltage between terminals of a motor irrespective of a driving frequency of the motor.

(1) A motor control device for controlling, by a duty control, a current supplied to a motor includes a driving controller, an off controller, and a voltage acquiring section. The driving controller performs on/off control of the current supplied to the motor with a first period. The off controller performs off control for the motor with a second period separately from the on/off control performed by the driving controller. The second period is longer than the first period. The voltage acquiring section acquires a voltage between terminals of the motor during a time period in which the off control is performed by the off controller.

With this configuration, the off control is performed for the motor with the second period, which is longer than the first period, separately from the on/off control performed by the driving controller. Therefore, it is possible to easily detect the voltage between the terminals during a time period in which the motor is off, irrespective of the driving frequency of the motor. As a result, even if the driving frequency of the motor is increased, it is possible to reduce operating noise of the motor.

(2) The motor control device of (1) may further include a duty ratio determining section that determines a duty ratio to be used in driving control of the motor, based on the voltage between the terminals acquired by the voltage acquiring section.

With this configuration, it is possible to drive the motor using the duty ratio.

(3) The motor control device of any one of (1) to (2) may further include a rotational state determining section that determines a rotation state of the motor based on the voltage between the terminals acquired by the voltage acquiring section.

With this configuration, it is possible to control the number of rotations of the motor and/or to detect malfunction of the motor.

(4) In the motor control device of any one of (1) to (3), the off controller may initiate the off control at a time point which is a predetermined time before a timing at which the voltage acquiring section acquires the voltage between the terminals.

With this configuration, the off control is initiated at the time point, which is the predetermined time before the timing at which the voltage between the terminals is acquired. Therefore, when the voltage between the terminals is acquired, the voltage between the terminals has been stable and can be acquired with high accuracy.

(5) A vehicle brake hydraulic pressure control apparatus includes a base body in which a hydraulic pressure circuit is formed, a motor that is mounted on the base body, the motor control device of any one of (1) to (4) that controls the motor, and a valve that controls the hydraulic pressure circuit.

With this configuration, even if a driving frequency of the motor in the vehicle hydraulic brake fluid control apparatus is increased, operation noise of the motor and operation noise of a pump driven by the motor can be reduced. As a result, the marketability of the vehicle hydraulic brake fluid control apparatus can be enhanced.

With the above configurations, it is facilitated to detect the voltage between the terminals during the time period in which the motor is off, irrespectively of the driving frequency of the motor. Therefore, even if the driving frequency of the motor is increased, the operation noise of the motor and the operation noise of the pump drive by the motor can be reduced.

DETAILED DESCRIPTION OF EXEMPLARY EMBODIMENTS

Embodiments of the invention will be described in detail with reference to the accompanying drawings.

Figure 1:
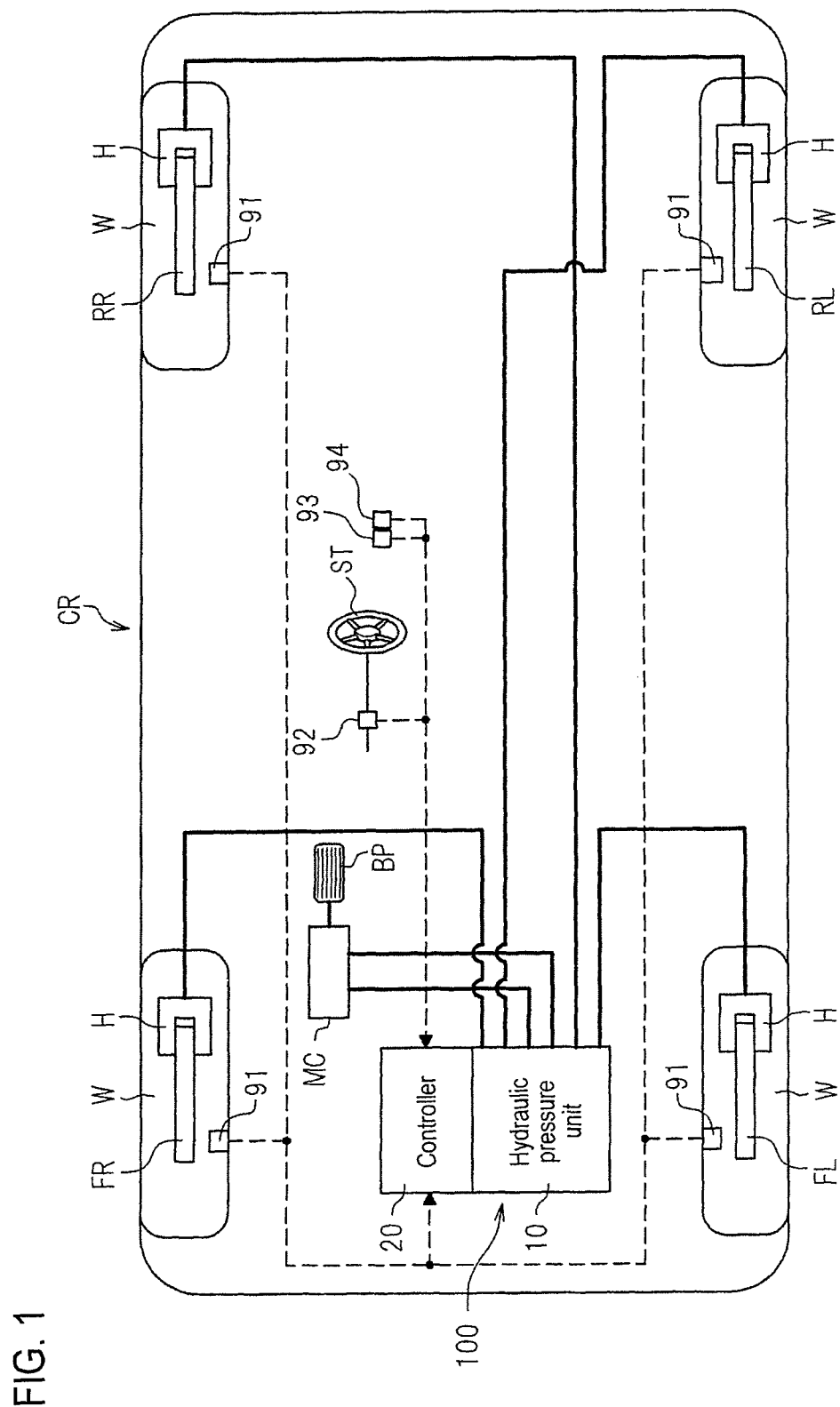
FIG. 1 is a configuration diagram showing a vehicle including a vehicle behavior control apparatus according to an embodiment of the invention.

FIG. 1 shows a vehicle behavior control apparatus 100 as an example of a vehicle brake hydraulic pressure control apparatus. The vehicle behavior control apparatus 100 controls a braking force (a brake fluid pressure) imparted to respective wheels W of a vehicle CR. The vehicle behavior control apparatus 100 mainly includes a hydraulic pressure unit 10 in which fluid lines (hydraulic pressure lines) and various parts are provided and a controller 20 that controls the various parts in the hydraulic pressure unit 10 as required.

Wheel speed sensors 91, a steering angle sensor 92, a lateral acceleration sensor 93, and a yaw rate sensor 94 are connected to the controller 20. The wheel speed sensors 91 detect wheel speeds of the wheels W. The steering angle sensor 92 detects a steering angle of a steering wheel ST. The lateral acceleration sensor 93 detects an acceleration (a lateral acceleration) which acts laterally on the vehicle CR. The yaw rate sensor 94 detects a turning angular velocity of the vehicle CR. The detection results of the sensors 91 to 94 are output to the controller 20.

The controller 20 includes, for example, a CPU, a RAM, a ROM and an input/output circuit. The controller 20 executes controls by performing arithmetic operations based on inputs from the wheel speed sensors 91, the steering angle sensor 92, the lateral acceleration sensor 93 and the yaw rate sensor 94 as well as programs and data stored in the ROM.

Wheel cylinders H are hydraulic devices that converts a brake fluid pressure generated by a master cylinder MC and the vehicle behavior control apparatus 100 into operation forces working at wheel brakes FR, FL, RR, RL which are provided on the respective wheels W. The respective wheel cylinders H are connected to the hydraulic pressure unit 10 of the vehicle behavior control apparatus 100 by way of piping.

Figure 2:
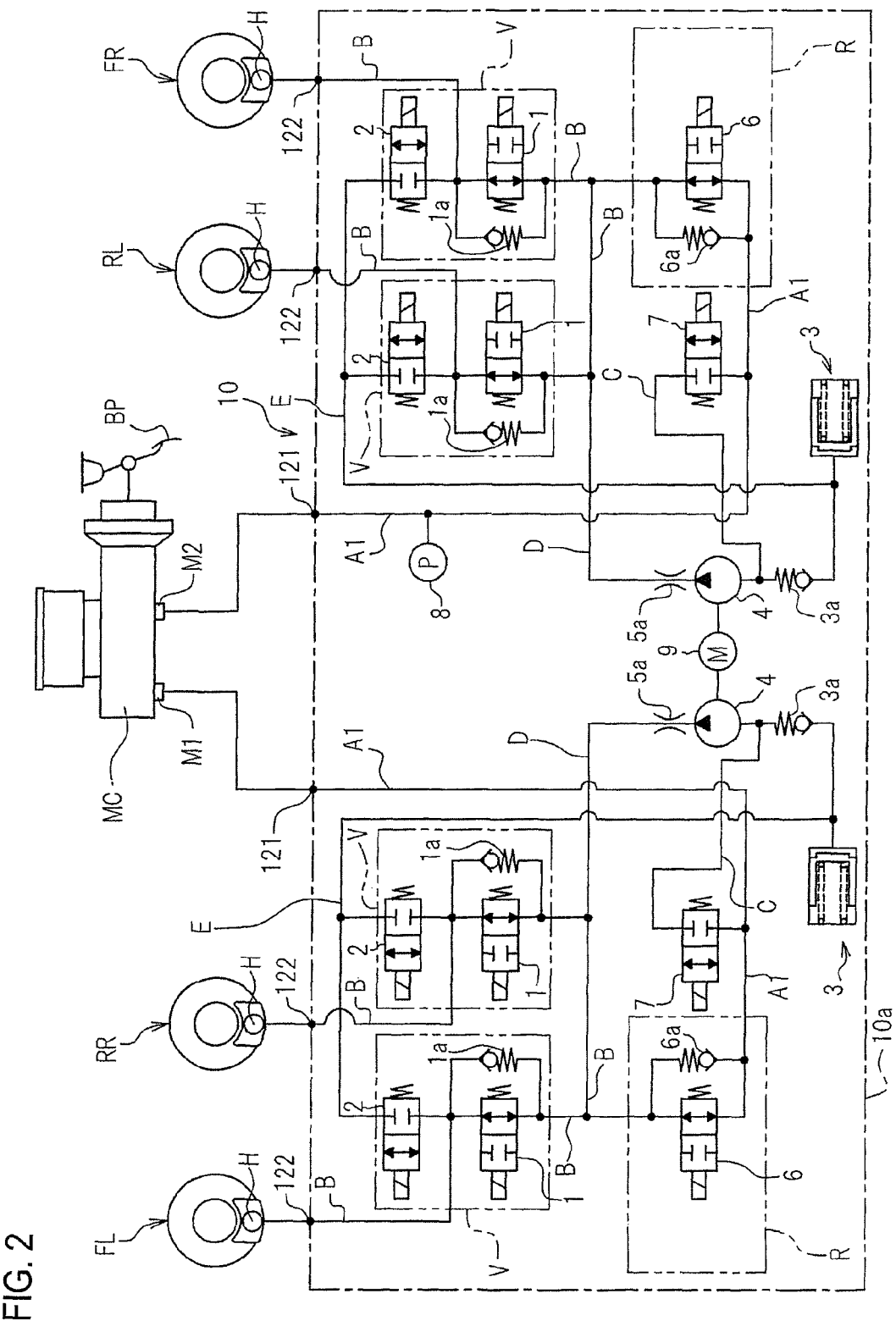
FIG. 2 is a configuration diagram showing a brake fluid pressure circuit of the vehicle behavior control apparatus.

As shown in FIG. 2, the hydraulic pressure unit 10 is disposed between the master cylinder MC and the wheel brakes FR, FL, RR, RL. The master cylinder MC is a hydraulic pressure source that generates a brake fluid pressure which corresponds to depression effort applied to a brake pedal BP by a driver. The hydraulic pressure unit 10 includes a pump body 10a, a plurality of inlet valves 1, a plurality of outlet valves 2, a plurality of control valve units V and the like. The pump body 10a is a base body having fluid lines (hydraulic pressure circuits) through which brake fluid flows. The inlet valves 1, the outlet valves 2, and the control valve units V are disposed on the fluid lines and are valves that control the hydraulic circuits.

Two output ports M1, M2 of the master cylinder MC are connected to inlet ports 121 of the pump body 10a. Output ports 122 of the pump body 10a are connected to the respective wheel brakes FR, FL, RR, RL. Then, normally, the fluid lines communicate from the inlet ports 121 to the outlet ports 122 within the pump body 10a, whereby the depression effort applied to the brake pedal BP is transmitted to the wheel brakes FL, RR, RL, FR.

In addition, a fluid line which starts from the output port M1 communicates with the wheel brake FL of the left front wheel and the wheel brake RR of the right rear wheel. A fluid line starting from the output port M2 communicates with the wheel brake FR of the right front wheel and the wheel brake RL of the left rear wheel. It is noted that in the following description, the fluid line starting from the output port M1 will be referred to as a "first system" and the fluid line starting from the output port M2 will be referred to as a "second system."

In the hydraulic pressure unit 10, two control valve units V are provided in the first system so as to correspond to the wheel brakes FL, RR. Similarly, in the second system, two control valve units V are provided so as to correspond to the wheel brakes RL, FR. Also, in the hydraulic pressure unit 10, a reservoir 3, a pump 4, an orifice 5a, a pressure regulator (regulator) R and a suction valve 7 are provided for each of the first system and the second system. Further, in the hydraulic pressure unit 10, a common motor 9 is provided which drives both the pump 4 of the first system and the pump 4 of the second system. This motor 9 is a number-of-rotations controllable motor whose number of rotations can be controlled according to a current supplied thereto and is mounted in the pump body 10a (not shown). Also, in this embodiment, a pressure sensor 8 is provided only for the second system.

It is noted that in the following description, the fluid lines starting from the output ports M1, M2 of the master cylinder MC and reaching the pressure regulators R will be referred to as "output hydraulic pressure lines A1." Fluid lines starting from the pressure regulator R in the first system and reaching the wheel brakes FL, RR and fluid lines starting from the pressure regulator R in the second system and reaching the wheel brakes RL, FR will be referred to as "wheel hydraulic pressure lines B." In addition, fluid lines starting from the output hydraulic pressure lines A1 and reaching the pumps 4 will be referred to as "suction hydraulic pressure lines C." Fluid lines starting from the pumps 4 and reaching the wheel hydraulic pressure lines B will be referred to as "discharge hydraulic pressure lines D." Further, fluid lines starting from the wheel hydraulic pressure lines B and reaching the suction hydraulic pressure lines C will be referred to as "release lines E."

The control valve units V are valves that control forward and backward transmission of hydraulic pressure from the master cylinder MC or the pumps 4 to the wheel brakes FL, RR, RL, FR (more specifically, the wheel cylinders H). The control valve units V can increase, hold, and reduce the pressures at the wheel cylinders H. Because of this, the control valve units V each include the inlet valve 1, the outlet valve 2 and a check valve 1a.

The inlet valves 1 are normally open solenoid valves that are provided between the wheel brakes FL, RR, RL, FR and the master cylinder MC, that is, in the wheel hydraulic pressure lines B. Being open normally, the inlet values 1 allow for transmission of brake fluid from the master cylinder MC to the respective wheel brakes FL, FR, RL, RR. Also, the inlet valves 1 are closed by the controller 20 when the wheels W are about to be locked. By doing so, the inlet valves 1 cut off the transmission of brake fluid from the brake pedal BP to the respective wheel brakes FL, FR, RL, RR.

The outlet valves 2 are normally closed solenoid valves that are provided between the respective wheel brakes FL, RR, RL, FR and the reservoirs 3, that is, between the wheel hydraulic pressure lines B and the release lines E. The outlet valves 2 are normally closed. The outlet valves 2 are opened by the controller 20 when the wheels W are about to be locked. Thereby, the outlet vales 2 allows the brake fluid pressures acting on the wheel brakes FL, FR, RL, RR to escape into the respective reservoirs 3.

The check valves 1a are connected to the corresponding inlet valves 1 in parallel. The check valves 1a are one-way valves that only permit brake fluid to flow from the wheel brakes FL, FR, RL, RR towards the master cylinder MC. When the input from the brake pedal BP is cancelled, the check valves 1a allow brake fluid to flow from the wheel brakes FL, FR, RL, RR towards the master cylinder MC.

The reservoirs 3 are provided in the release lines E. The reservoirs 3 have a function to suction the brake fluid, which escapes from the outlet valves 2 when the outlet valves 2 are opened. Also, check valves 3a are interposed between the reservoirs 3 and the pump 4. The check valves 3a allow only flows of brake fluid from the reservoirs 3 towards the pump 4.

The pumps 4 are interposed between the suction hydraulic pressure lines C, which communicate with the output hydraulic pressure lines A1, and the discharge hydraulic pressure lines D, which communicate with the wheel hydraulic pressure lines B. The pumps 4 have a function to suction the brake fluid reserved in the reservoirs 3 so as to discharge it to the discharge hydraulic pressure lines D. By this function, the brake fluid suctioned by the reservoirs 3 can be returned to the master cylinder MC. Also, braking forces can be generated at the wheel brakes FL, RR, RL, FR by, for example, generating brake fluid pressures even if the brake pedal BP is not operated by the driver.

It is noted that a discharge amount of brake fluid discharged by the pump 4 depends on the number of rotations of the motor 9. For example, the discharge amount of brake fluid discharged by the pump 4 increases as the number of rotations of the motor 9 increases.

The orifices 5a attenuate pulsation of the pressure of brake fluid discharged from the pump 4 by its cooperation operation and pulsation generated by the operation of the pressure regulators R, which will be described later.

The pressure regulators R are normally open. By being so open, the pressure regulators R allow flows of brake fluid from the output hydraulic pressure lines A1 towards the wheel hydraulic pressure lines B. Also, when it is attempted to increase the pressures at the wheel cylinders H by pressures generated by the pumps 4, the pressure regulators R have a function to control the pressures in the discharge hydraulic pressure lines D and the wheel hydraulic pressure lines B and at the wheel cylinders H to be a set value or lower while blocking the flow of brake fluid. Because of this, the pressure regulators R each include a selector valve 6 and a check valve 6a.

The selector valves 6 are interposed between the output hydraulic pressure lines A1, which communicate with the master cylinder MC, and the wheel hydraulic pressure lines B, which communicate with the wheel brakes FL, FR, RL, RR. The selector valves 6 are normally open linear solenoid valves. Although not shown in detail, a valve body of the selector valve 6 is biased towards the wheel hydraulic pressure line B and the wheel cylinders H by an electromagnetic force corresponding to a supplied current. When a pressure in the wheel hydraulic pressure line B becomes higher by a predetermined value (this predetermined value depending on the supplied current) than a pressure in the output hydraulic pressure line A1, the brake fluid escapes from the wheel hydraulic pressure line B to the output hydraulic pressure line A1, whereby the pressure on the wheel hydraulic pressure line B side is controlled to be a predetermined pressure.

Each check valve 6a is connected in parallel to the corresponding selector valve 6. This check valve 6a is a one-way valve that allows a flow of brake fluid from the output hydraulic pressure line A1 to the wheel hydraulic pressure line B.

The suction valves 7 are normally closed solenoid valves that are provided in the suction hydraulic pressure lines C. The suction valves 7 switch the suction hydraulic pressure lines C between a released state and a blocked state. The suction valves 7 are controlled to be opened by the controller 20 when the brake fluid pressure is to be acted on the wheel brakes FL, FR, RL, RR in a state where the selector valve 6 is closed, that is, the driver does not operate the brake pedal BP.

The pressure sensor 8 detects a brake fluid pressure in the output hydraulic pressure line A1 of the second system. The detection results by the pressure sensor 8 are input to the controller 20.

Next, the controller 20 will be described in detail.

Figure 3:
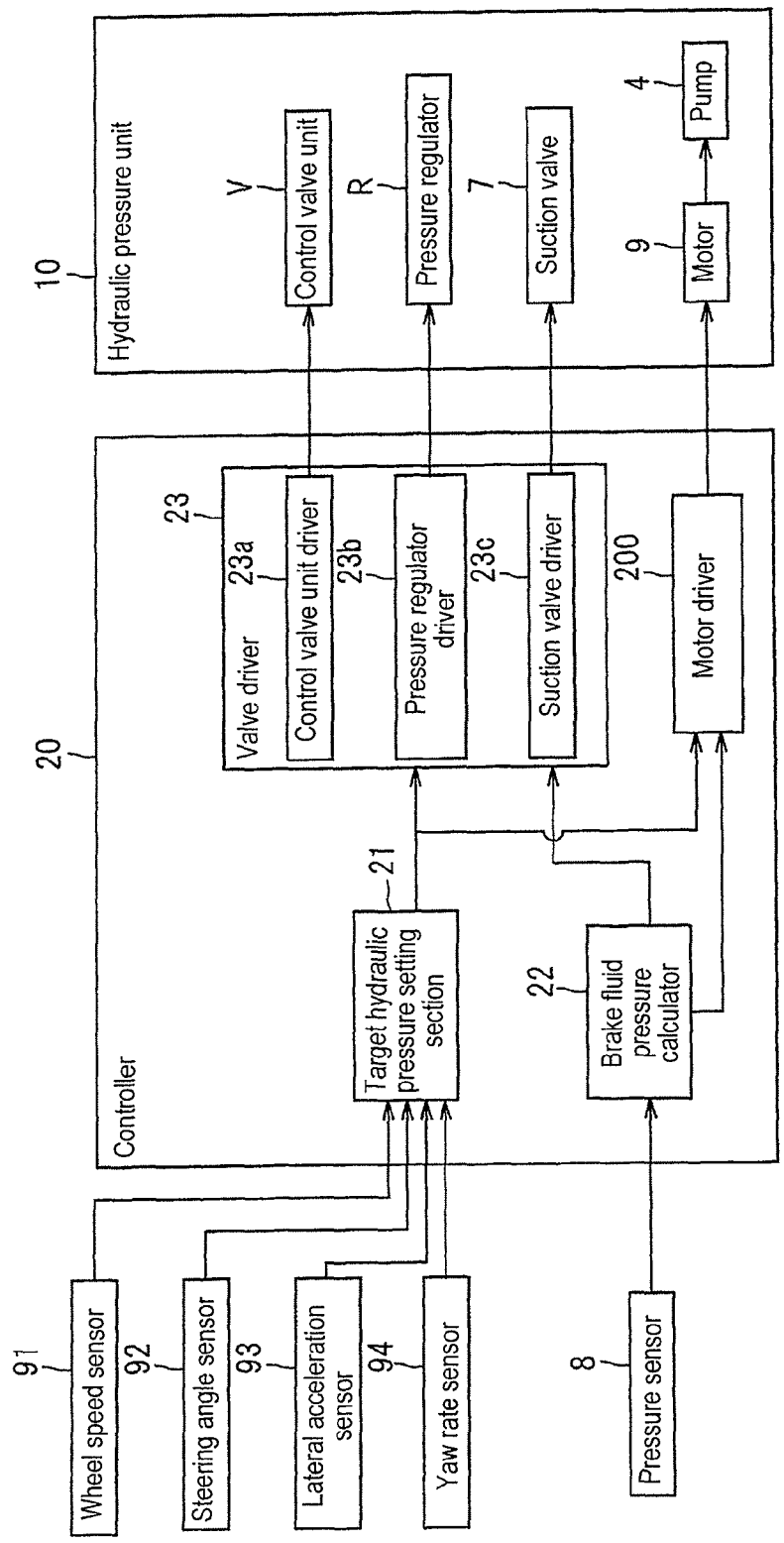
FIG. 3 is a block diagram showing the configuration of a controller.

As shown in FIG. 3, the controller 20 controls the opening and closing operations of the control valve units V, the selector valves 6 (pressure regulators R), and the suction valves 7 and the operation of the motor 9 in the hydraulic pressure unit 10 based on the signals input from the sensors 91 to 94 and the pressure sensor 8 so as to control the operations of the respective wheel brakes FL, RR, RL, FR. The controller 20 includes a target hydraulic pressure setting section 21, a brake fluid pressure calculator 22, a valve driver 23 and a motor driver 200.

The target hydraulic pressure setting section 21 selects a control logic based on the signals input from the sensors 91 to 94. Then, the target hydraulic pressure setting section 21 sets a target pressure PT for each of the wheel brakes FL, RR, RL, FR according to the selected control logic. The setting method is not particularly limited.

An example of the method for setting the target hydraulic pressure PT will be described below. Firstly, a yaw rate of the vehicle CR which is estimated from a steering angle detected by the steering angle sensor 92 and a vehicle body velocity is calculated as a target yaw rate. Then, a yaw rate deviation is calculated by subtracting the target yaw rate from an actual yaw rate. It is determined based on this yaw rate deviation as to whether the vehicle CR is in an over steered condition or an under steered condition. Then, an amount of moment which is necessary to correct the over steered condition or the under steered condition is calculated. Further, by expressing the amount of moment in terms of brake fluid pressure, the target hydraulic pressure PT for each of the wheel brakes FL, RR, RL, FR is set.

The target hydraulic pressures PT so set are output from the target hydraulic pressure setting section 21 to the valve driver 23 and the motor driver 200.

The brake fluid pressure calculator 22 calculates a brake fluid pressure (an estimated brake fluid pressure) at each of the wheel brakes FL, RR, RL, FR based on the brake fluid pressure detected by the pressure sensor 8, that is, a master cylinder pressure and driven amounts of the solenoid valves 1, 2, 6 by the valve driver 23.

The brake fluid pressures so calculated are then output from the brake fluid pressure calculator 22 to the valve driver 23 and the motor driver 200.

The valve driver 23 controls the driving of the control valve units V, the pressure regulators R and the suction valves 7 based on the target hydraulic pressures PT and the respective estimated brake fluid pressures. To describe this in more detail, the valve driver 23 outputs a pulse signal that causes the inlet valves 1, the outlet valves 2, the selector valves 6 and the suction valves 7 in the hydraulic pressure unit 10 to operate so that the brake fluid pressures at the wheel cylinders H of the wheel brakes FL, RR, RL, FR coincide with the target hydraulic pressures PT. This pulse signal includes more pulses as, for example, a difference between the current brake fluid pressure at the wheel cylinder H and the target hydraulic pressure PT increases.

The valve driver 23 functioning as described above includes a control valve unit driver 23a that drives the control valve units V, a pressure regulator driver 23b that drives the pressure regulators R, and a suction valve driver 23c that drives the suction valves 7.

If it is determined based on the differences between the target hydraulic pressures PT and the estimated brake fluid pressures that the pressures at the wheel cylinders H should be increased (raised pressure should be applied to the wheel cylinders), the control valve unit driver 23a causes a current to flow to neither the inlet valves 1 nor the outlet valves 2, whereby the inlet valves 1 are opened while the outlet valves 2 are closed. Also, if it is determined based on the differences between the target hydraulic pressures PT and the estimated brake fluid pressures that the pressures at the wheel cylinders H should be reduced (lowered pressure should be applied to the wheel cylinders), the control valve unit driver 23a causes a current to flow to both the inlet valves 1 and the outlet valves 2, whereby the inlet valves 1 are closed while the outlet valves 2 are opened. By doing so, the brake fluid in the wheel cylinders H is allowed to flow out from the outlet valves 2. Further, if it is determined that the pressures at the wheel cylinders H should be maintained, the control valve unit driver 23a causes a current to flow to the inlet valves 1 and causes no current to flow to the outlet valves 2, whereby both the inlet valves 1 and the outlet valves 2 are closed.

The pressure regulator driver 23b normally does not cause a current to flow to the pressure regulators R. Also, if the target hydraulic pressures PT are input thereto from the target hydraulic pressure setting section 21, the pressure regulator driver 23b causes currents corresponding to the target hydraulic pressures PT to flow to the pressure regulators R. If the currents are caused to flow to the pressure regulators R, the valve bodies of the pressure regulators R (the selector valves 6) are biased towards the wheel hydraulic pressure lines B by means of electromagnetic forces corresponding to the currents. If the pressurization by the pumps 4 makes the pressures in the wheel hydraulic pressure lines B equal to or larger than the biasing forces by which the valve bodies are biased, the brake fluid is allowed to escape to the output hydraulic pressure lines A1. Thereby, the pressures in the wheel hydraulic pressure lines B and the discharge hydraulic pressure lines D are controlled to the predetermined pressures.

The suction valve driver 23c does not normally cause a current to flow to the suction valves 7. Also, if it is determined based on the target hydraulic pressures PT output by the target hydraulic pressure setting section 21 that the pressures at the wheel cylinders H should be increased and if the master cylinder pressure detected by the pressure sensor 8 is lower than the target hydraulic pressures PT, the suction valve driver 23c causes currents to flow to the suction valves 7 so as to enable the pressurization by the pumps 4. By doing so, the suction valves 7 are opened, whereby the brake fluid is allowed to flow from the master cylinder MC to the pumps 4.

Figure 4:
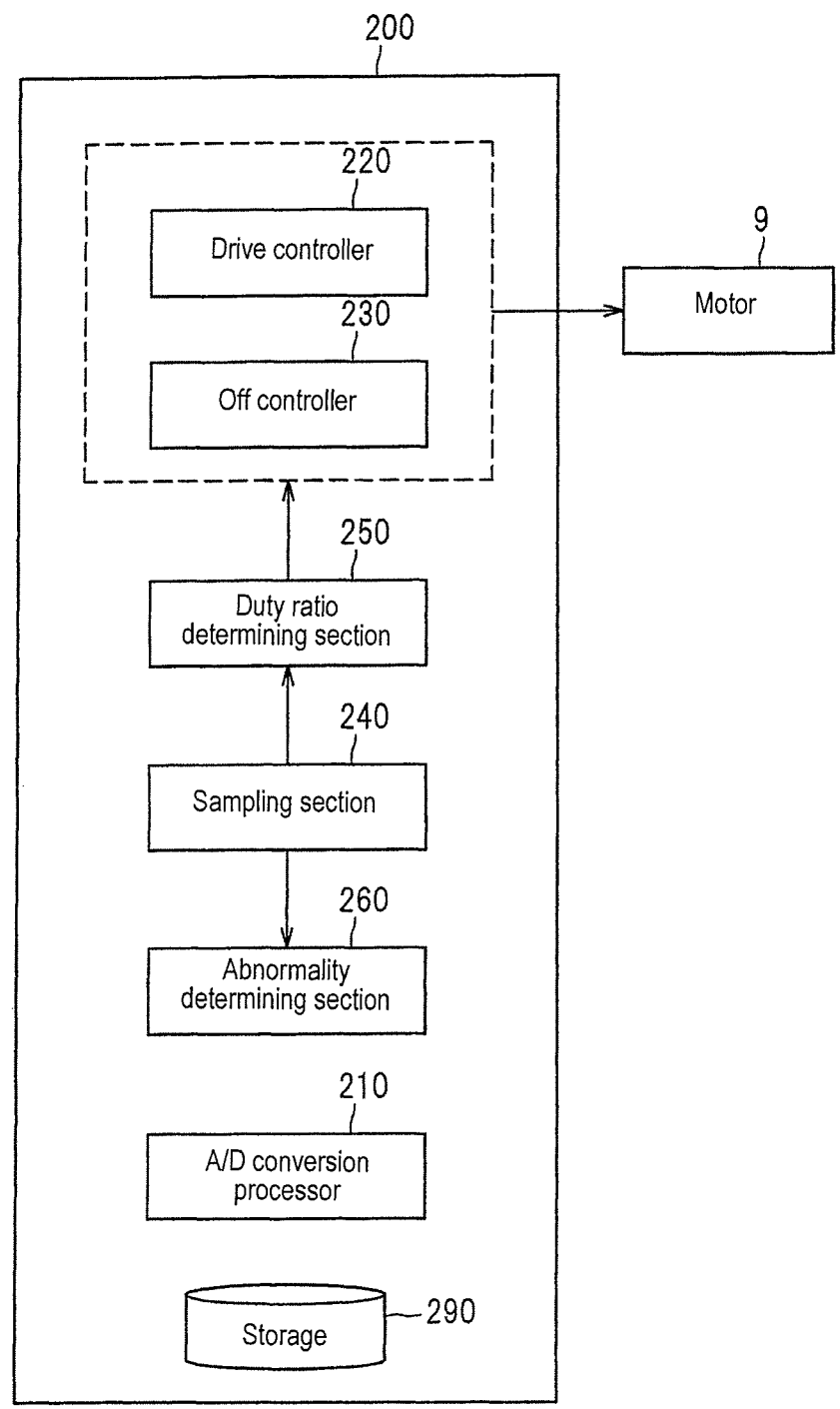
FIG. 4 is a block diagram of a motor driver.

The motor driver 200 is an example of a motor control device. The motor driver 200 determines the number of rotations of the motor 9 based on the target hydraulic pressures PT and the estimated brake fluid pressures, to drive the motor 9. Namely, the motor driver 200 drives the motor 9 through the number-of-rotations control. For example, the motor driver 200 performs the number-of-rotations control through a duty control. Because of this, as shown in FIG. 4, the motor driver 200 has an A/D conversion processor 210, a drive controller 220, an off controller 230, a sampling section 240, a duty ratio determining section 250, an abnormality determining section 260, and a storage 290.

The A/D conversion processor 210 has a function to acquire a voltage (an analog value) between terminals of the motor 9 on a predetermined cycle and to convert the acquired voltage (analog value) between the terminals of the motor 9 into a digital value. Also, the A/D conversion processor 210 causes the converted digital value to pass through a low-pass filter to acquire a value from which high-frequency noise is removed. The filtered digital value acquired by the A/D conversion processor 210 is stored in the storage 290.

The drive controller 220 on/off controls the motor 9 by means of the duty control based on a duty ratio determined by the duty ratio determining section 250. This on/off control is executed on a first cycle T1. In this embodiment, it is assumed that the A/D conversion processor 210 acquires the voltage between the terminals of the motor 9 on the first cycle T1 and executes the A/D conversion on the first cycle T1. However, these cycles do not have to coincide with each other.

The off controller 230 has a function to perform the off control for the motor 9 on a second cycle T2 which is longer than the first cycle T1, separately from the on/off control executed by the drive controller 220. In this embodiment, the cycle of this off control is made slightly longer than the first cycle T1. However, the second cycle T2 does not have to be longer than the first cycle T1. Namely, there will be no problem in a case where the second cycle T2 is a period which equal to the first period T1 or a period which is slightly shorter than the first cycle T1. The period of the off control should be such as to ensure something like a length of time which results from adding a time in which a change in a value generated by the low-pass filter process delays to the cycle on which the A/D conversion processor 210 performs its function. This is because in a case where something like this length of time is ensured as the period of the off control, the voltage between the terminals of the motor 9 can be acquired during the period of the off control in an ensured fashion. It is noted that when no low-pass filter process is involved, something like a length of time should be ensured which results from adding a time a response to the indication of the voltage between the terminals of the motor 9 delays to the cycle on which the A/D conversion processor 210 performs its function.

The off controller 230 starts the off control a predetermined length of time before a timing at which the sampling section 240 acquires (samples) a voltage between the terminals. In this embodiment, the off controller 230 monitors the value of a period counter operated by the sampling section 240, which will be described later. Then, if the value of the period counter becomes equal to or smaller than a predetermined threshold Cth, the off controller 230 cuts off the current flowing to the motor. By doing so, the off control is started at a predetermined timing.

The sampling section 240 has a function to acquire the voltage between the terminals of the motor 9 during the period of the off control executed by the off controller 230. In this embodiment, a digital value acquired by the A/D conversion processor 210 through the digitalization and filter processes is stored in the storage 290 every time a calculation cycle of the A/D conversion process ends. Because of this, the sampling section 240 acquires (samples) a digital value of a latest voltage between the terminals as a voltage $V_M$ based on which a rotation state of the motor 9 is determined and stores the voltage $V_M$ in the storage 290.

The A/D conversion processor 210 and the sampling section 240 work in cooperation with each other to acquire the voltage between the terminals of the motor 9 during the period of the off control. The A/D conversion processor 210 and the sampling section 240 constitute an example of a voltage acquiring section.

The sampling section 240 acquires the voltage $V_M$ based on which the rotation state of the motor 9 is determined from the storage 290 at a predetermined timing during the period of the off control executed by the off controller 230. Thus, the sampling section 240 has a period counter. The period counter counts down the count value every time the calculation cycle of the A/D conversion process ends (that is, in this embodiment, every time the first cycle T1 ends). Then, if the period counter counts down the count value to 0 or smaller, the period counter is reset to the second cycle T2 which is an initial value.

The duty ratio determining section 250 has a function to determine a duty ratio which is used for the driving control of the motor 9 based on the voltage $V_M$ acquired by the sampling section 240. For example, the duty ratio determining section 250 determines the duty ratio by means of the PI control based on a target number-of-rotations of the motor 9 (which can be determined based on the differences between the target hydraulic pressures PT and the estimated brake fluid pressures). Details of the determination method will be described later with reference to a flowchart shown in FIG. 6.

The abnormality determining section 260 determines the rotation state of the motor 9 based on the voltage $V_M$ acquired by the sampling section 240. The abnormality determining section 260 is a part of a rotational state determining section. Specifically, if the voltage $V_M$ based on which the rotation state of the motor 9 is determined is equal to or smaller than a predetermined threshold, it is highly likely that the number-of-rotations of the motor 9 is slow and that the motor 9 is stopped. Therefore, the abnormality determining section 260 determines that the rotation state of the motor 9 is abnormal.

The storage 290 is a section that stores values acquired from various calculations and constants. Also, the storage 290 stores in advance a table in which a target number-of-rotations of the motor 9 is associated with a target voltage $V_T$ of the motor 9.

Next, the operation of the controller 20 of the vehicle behavior control apparatus 100 which is configured as described above will be described. Here, referring to FIGS. 5 and 6, a process of acquiring the voltage between the terminals of the motor and a process of calculating the duty ratio will be described.

Figure 5:
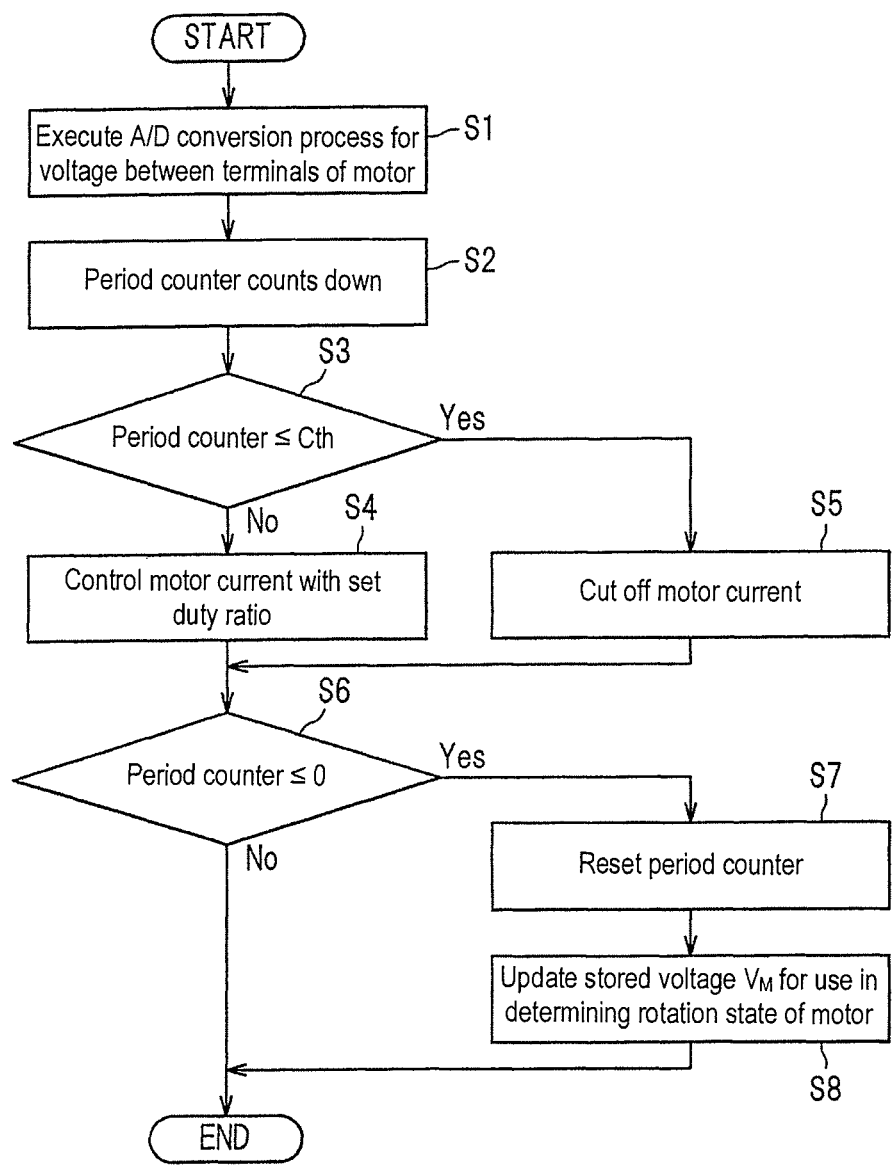
FIG. 5 is a flow chart of a process for obtaining a voltage between terminals of a motor.

A process shown in FIG. 5 is repeatedly performed on the first cycle T1 in the vehicle behavior control apparatus 100 while the motor 9 is operated or the abnormality of the motor 9 is diagnosed.

Firstly, the A/D conversion processor 210 acquires a voltage between the terminals of the motor 9 as an analog signal and digitizes a value of the analog signal. Then, the A/D conversion processor 210 causes the value, which is digitized this time, to pass through a low-pass filter by using the past voltages between the terminals of the motor 9, which are stored in the storage 290, and the value digitized this time. The A/D conversion processor 210 stores the latest digital value which is acquired as a result of this process in the storage 290 (51).

Then, the period counter of the sampling section 240 counts down a count value (S2). It is noted that the initial value of the period counter is the second cycle T2.

Next, the off controller 230 determines as to whether or not the count value of the period counter is equal to or smaller than a threshold Cth (S3). If the count value of the period counter is larger than the threshold Cth (S3, No), the drive controller 220 controls a motor current with a set duty ratio (S4). On the other hand, if the count value of the period counter is equal to or smaller than the threshold Cth (S3, Yes), the off controller 230 cuts off the current flowing to the motor 9 (S5).

Next, the sampling section 240 determines as to whether or not the count value of the period counter is equal to or smaller than 0 (S6). If the count value of the period counter is larger than 0 (S6, No), the process ends. On the other hand, if the count value of the period counter is equal to or smaller than 0 (S6, Yes), the period counter is reset to the second cycle T2 (S7). Then, the voltage $V_M$ stored in the storage 290, based on which the rotation state of the motor 9 is determined is replaced by the digital value of the latest voltage for update (S8). Namely, the voltage $V_M$ is acquired. If the period counter is reset, a motor current control by the drive controller 220 is performed in a cycle of the next process (S4).

Figure 6:
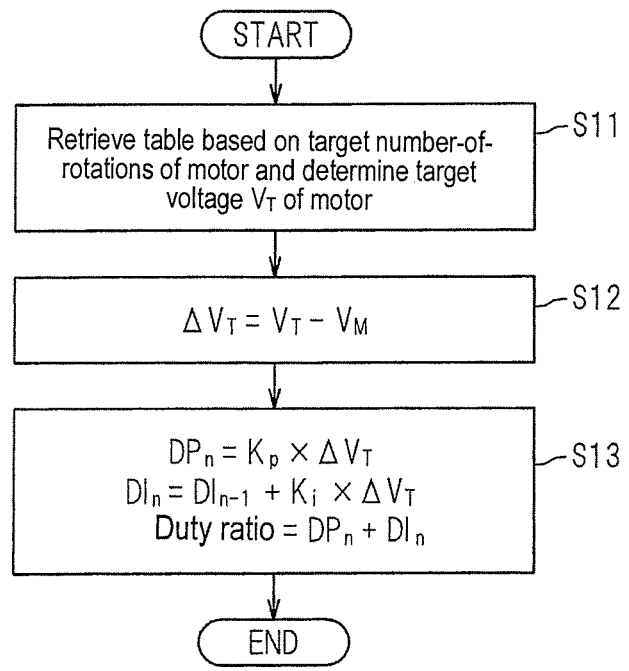
FIG. 6 is a flow chart of a process for determining a duty ratio for use in driving control of a motor, based on the voltage between the terminals of the motor obtained by a sampling section.

Next, the duty ratio determining process will be described. As shown in FIG. 6, firstly, the table stored in the storage 290 is retrieved based on the target number-of-rotations of the motor 9, and a target voltage $V_T$ of the motor 9 is determined (S11).

Then, a deviation $\Delta V_T$ between the target voltage $V_T$ and the voltage $V_M$ based on which the rotation state of the motor 9 is determined is calculated (S12). Further, a proportion term $DP_n$ and an integration term $DI_n$ are calculated by the following expression:

$$DP_n = K_p \times \Delta V_T$$

$$DI_n = DI_{n-1} + K_i \times \Delta V_T$$

where, Kp, Ki denote constants, a suffix n denotes a current calculated value, and a suffix n−1 denotes a previous calculated value. Then, the duty ratio is determined from a sum of $DP_n$ and $DI_n$ (S13). The duty ratio determined in this way is used in controlling the current of the motor 9 as described in step S5 in FIG. 5.

Figure 7:
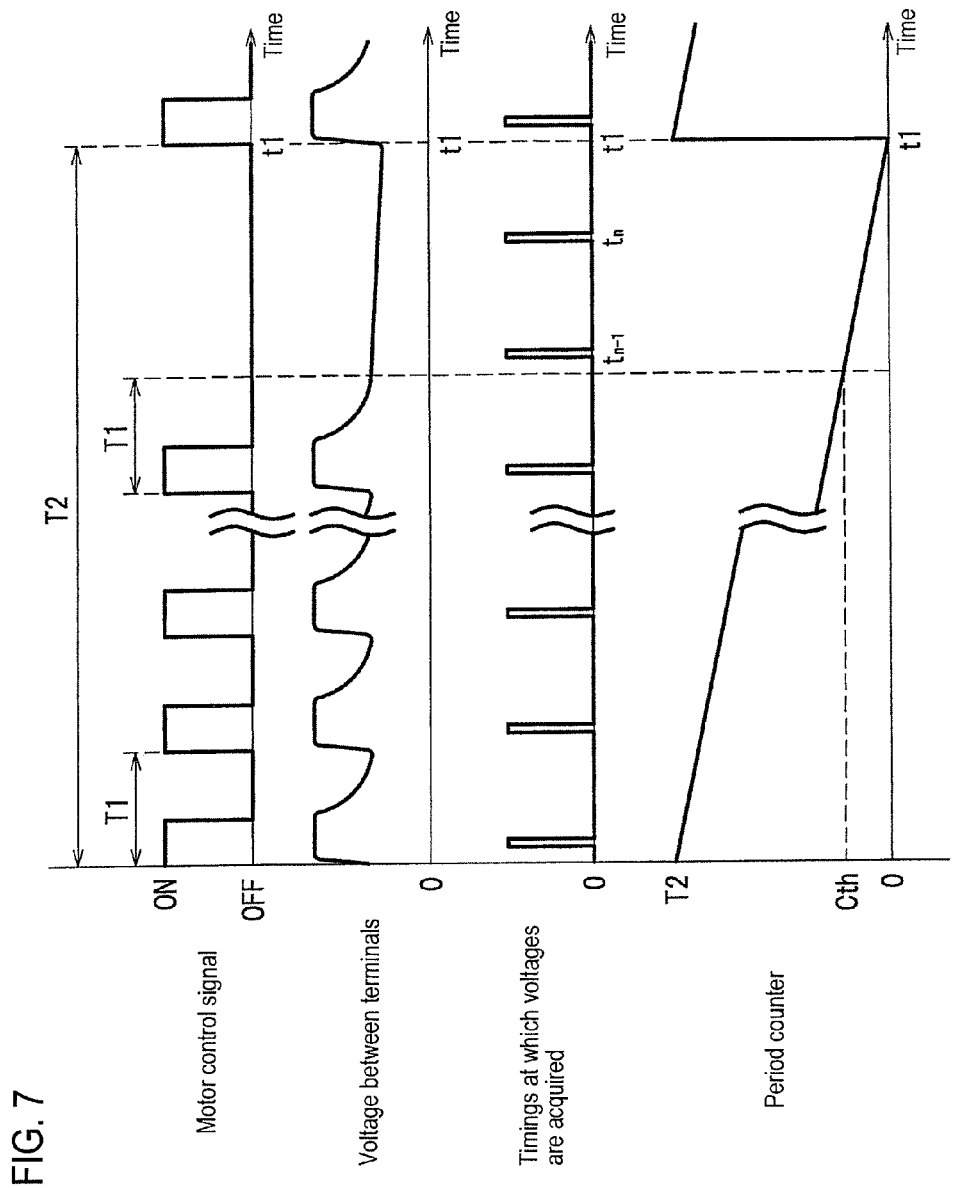
FIG. 7 is graphs, for explanation of an operation of a motor driving device, showing a motor control signal, the voltage between the terminals of the motor, and a period counter

According to the processes described above, as shown in FIG. 7, the motor control signal repeats a single on/off on the first cycle T1. Also, the voltage between the terminals is acquired similarly on the first cycle T1 by the A/D conversion processor 210 (refer to a graph showing voltage acquiring timings). Then, the voltage between the terminals of the motor 9 (FIG. 7 shows a case where the voltage is A/D converted in a cycle which is shorter than T1 as a matter of convenience in describing the tendency of a change in voltage between the terminals of the motor) changes with a slight delay when the motor control signal is changed from on to off.

Then, the period counter gradually counts down from the second cycle T2. If the count value of the period counter becomes equal to or smaller than the threshold Cth, the motor control signal is switched off by the off controller 230. Then, at a time $t_1$ at which the count value of the period counter becomes 0, a digital value of a latest voltage value which is stored by the A/D conversion processor 210 immediately before the time $t_1$, that is, a voltage value which is acquired at a time $t_n$ shown in FIG. 7 is acquired as the voltage $V_M$ based on which the rotation state of the motor 9 is determined. At this moment, the off control has been started a predetermined length of time (a length of time corresponding to the threshold Cth) before a point in time at which the voltage between terminals of the motor 9 (the voltage $V_M$) is acquired as shown by the voltage between the terminals of the motor in FIG. 7. Therefore, it is possible to acquire the voltage $V_M$ based on which the rotation state of the motor 9 is determined in such a state that the voltage between the terminals is stable.

Here, let's assume that it is attempted to acquire a voltage between the terminals during the period of the off control in the duty control of the motor 9 without the off controller 230 performing the off control. In this case, it is necessary to surely find the off period within the first cycle T1. Therefore, it is necessary to acquire the analog signal of the voltage between the terminals and perform the A/D conversion process in a very short cycle such as one tenth of the first cycle T1.

However, in the motor driver 200 of this embodiment, the off controller 230 performs the off control separately from the on/off control by the drive controller 220, and the voltage between the terminals is acquired during the period of this off control. Therefore, the timing at which the voltage between the terminals is acquired has nothing to do with the drive frequency (the first period T1) of the motor 9. It is possible to detect the voltage between the terminals during the period of the off control of the motor 9 independent of the drive frequency of the motor 9.

Therefore, in the motor driver 200 and the vehicle behavior control apparatus 100 of this embodiment, it is possible to reduce the operation noise of the motor 9 and the pump 4 by increasing the drive frequency of the motor 9. This enables to enhance the product quality of the vehicle behavior control apparatus 100. Also, even if the drive frequency of the motor 9 is increased, it is possible to acquire the voltage between the terminals during the period in which the motor 9 is off in an ensured fashion. Therefore, the control of the motor 9 and the abnormality determination of the motor 9 can be performed well.

While the embodiment of the invention has been described heretofore, the invention is not limited thereto. The specific configuration may be modified as required so long as the modified configuration does not depart from the spirit and scope of the invention.

For example, the period counter is in a form in which the value is counted down in the embodiment. However, the period counter may be in a form in which the value is counted up.

In the embodiment, the abnormality of the motor is determined as a determination of the rotation state of the motor. However, the number-of-rotations of the motor may be adopted as a means for determining the rotation state of the motor.

In the embodiment, the vehicle behavior control apparatus for executing a vehicle behavior stabilizing control is illustrated as the vehicle brake hydraulic pressure control apparatus. However, the vehicle brake hydraulic pressure control apparatus may execute an automatic braking control while the vehicle is running or a control for holding the braking force while the vehicle is stopped.

What is claimed is:

1. A motor control device for controlling, by a duty control, a current supplied to a motor, the motor control device comprising:
a driving controller that performs on/off control of the current supplied to the motor with a first period;
an off controller that performs off control for the motor separately from the on/off control performed by the driving controller, the off controller performs the off control with a second period being longer than the first period; and
a voltage acquiring section that acquires a voltage between terminals of the motor during a time period in which the off control is performed by the off controller,
wherein the off controller performs the off control in parallel with the on/off control performed by the driving controller, from a start of the off time of the off control to a point in time where a certain condition is met.

2. The motor control device according to claim 1, further comprising:
a duty ratio determining section that determines a duty ratio to be used in driving control of the motor, based on the voltage between the terminals acquired by the voltage acquiring section.

3. The motor control device according to claim 1, further comprising:
a rotational state determining section that determines a rotation state of the motor based on the voltage between the terminals acquired by the voltage acquiring section.

4. The motor control device according to claim 2, further comprising:
a rotational state determining section that determines a rotation state of the motor based on the voltage between the terminals acquired by the voltage acquiring section.

5. The motor control device according to claim 1, wherein the off controller initiates the off control at a time point which is a predetermined time before a timing at which the voltage acquiring section acquires the voltage between the terminals.

6. The motor control device according to claim 2, wherein the off controller initiates the off control at a time point which is a predetermined time before a timing at which the voltage acquiring section acquires the voltage between the terminals.

7. The motor control device according to claim 3, wherein the off controller initiates the off control at a time point which is a predetermined time before a timing at which the voltage acquiring section acquires the voltage between the terminals.

8. The motor control device according to claim 4, wherein the off controller initiates the off control at a time point which is a predetermined time before a timing at which the voltage acquiring section acquires the voltage between the terminals.

9. A vehicle brake hydraulic pressure control apparatus comprising:
a base body in which a hydraulic pressure circuit is formed;
a motor that is mounted on the base body;
the motor control device, according to claim 1, that controls the motor; and
a valve that controls the hydraulic pressure circuit.

10. A motor control device for controlling, by a duty control, a current supplied to a motor, the motor control device comprising:
a driving controller that performs on/off control of the current supplied to the motor with a first period;
an off controller that performs off control for the motor separately from the on/off control performed by the driving controller, the off controller performs the off control with a second period being longer than the first period; and
a voltage acquiring section that acquires a voltage between terminals of the motor during a time period in which the off control is performed by the off controller;
a duty ratio determining section that determines a duty ratio to be used in driving control of the motor, based on the voltage between the terminals acquired by the voltage acquiring section,
wherein the duty ratio determining section:
retrieves a table stored in storage based on a target number-of-rotations of the motor, determines a target voltage $V_T$ of the motor,
calculates a deviation $\Delta V_T$ between the target voltage $V_T$ and a latest voltage $V_M$ between the terminals based on which the rotation state of the motor,
calculates a proportion term DPn and an integration term DIn by:

$$DPn = Kp \times \Delta V_T$$

$$DIn = DIn-1 + Ki \times \Delta V_T$$

where, Kp, Ki denote constants, n denotes a current calculated value, and n−1 denotes a previous calculated value, and determines the duty ratio from a sum of DPn and Din.

11. The motor control device according to claim 1, further comprising:
a counter that counts down a count value, wherein
the certain condition contains a condition that the count value of the counter is equal to or smaller than a threshold.

12. The motor control device according to claim 11, wherein during the off control, the off controller cuts off the current flowing to the motor if the certain condition is met.

13. A motor control device for controlling, by a duty control, a current supplied to a motor, the motor control device comprising:
a driving controller that performs on/off control of the current supplied to the motor with a first period:
an off controller that performs off control for the motor separately from the on/off control performed by the driving controller, the off controller performs the off control with a second period being longer than the first period; and
a voltage acquiring section that acquires a voltage between terminals of the motor during a time period in which the off control is performed by the off controller, wherein
the off controller starts the off control a predetermined length of time before a timing at which a sampling section acquires a voltage between the terminals,
the off controller monitors a value of a counter, and
if the value of the counter becomes equal to or smaller than a threshold, the off controller cuts off the current flowing to the motor.

14. The motor control device according to claim 13, wherein the sampling section acquires a digital value of a latest voltage between the terminals as a latest voltage based on which a rotation state of the motor is determined.

15. The motor control device according to claim 14, wherein the counter counts down a count value every time a calculation cycle of an A/D conversion process ends.

16. The motor control device according to claim 15, further comprising:
a duty ratio determining section that determines a duty ratio which is used for the driving control of the motor based on the latest voltage acquired by the sampling section.

17. The motor control device according to claim 16, further comprising:
an abnormality determining section that determines a rotation state of the motor based on the latest voltage acquired by the sampling section.

18. A motor control device for controlling, by a duty control, a current supplied to a motor, the motor control device comprising:
a driving controller that performs on/off control of the current supplied to the motor with a first period;
an off controller that performs off control for the motor separately from the on/off control performed by the driving controller, the off controller performs the off control with a second period being longer than the first period;
a voltage acquiring section that acquires a voltage between terminals of the motor during a time period in which the off control is performed by the off controller; and
a counter that counts down a count value, wherein
the off controller determines as to whether or not the count value of the counter is equal to or smaller than a threshold,
if the count value of the counter is larger than the threshold, the driving controller controls the current supplied to the motor with a set duty ratio, and
if the count value of the counter is equal to or smaller than the threshold, the off controller cuts off the current flowing to the motor.

\* \* \* \* \*